United States Patent [19]
Adams et al.

[11] Patent Number: 6,061,921
[45] Date of Patent: May 16, 2000

[54] FENCE POSITIONING APPARATUS

[75] Inventors: Phillip A. Adams, 6 Villa Jardin, San Antonio, Tex. 78230; Sherman S. Kline, San Antonio, Tex.

[73] Assignee: Phillip A. Adams, San Antonio, Tex.

[21] Appl. No.: 09/058,476

[22] Filed: Apr. 10, 1998

[51] Int. Cl.$^7$ .................................................. B23B 49/00
[52] U.S. Cl. ........................................ 33/638; 144/253.1
[58] Field of Search ............................ 33/628, 630, 638, 33/639, 640, 641, 642; 144/253.1; 269/60, 71, 72

[56] References Cited

U.S. PATENT DOCUMENTS

| | | |
|---|---|---|
| 1,234,606 | 7/1917 | Benedict . |
| 2,576,340 | 1/1951 | Hammond . |
| 4,013,280 | 3/1977 | Chitayat et al. . |
| 4,291,468 | 9/1981 | Follett . |
| 4,619,049 | 10/1986 | Griffin .................................. 144/253.1 |
| 4,787,794 | 11/1988 | Guthrie . |
| 4,793,604 | 12/1988 | Taylor . |
| 4,930,221 | 6/1990 | Taylor ...................................... 33/640 |
| 4,936,722 | 6/1990 | Schwinn . |
| 5,018,562 | 5/1991 | Adams ................................. 144/253.1 |
| 5,215,296 | 6/1993 | Adams . |
| 5,299,609 | 4/1994 | Wedler ...................................... 33/628 |
| 5,337,641 | 8/1994 | Duginske .............................. 144/253.1 |
| 5,553,644 | 9/1996 | Adams .................................. 144/253.1 |
| 5,768,966 | 6/1998 | Duginske ............................. 144/253.1 |

*Primary Examiner*—G. Bradley Bennett
*Attorney, Agent, or Firm*—Cox & Smith Incorporated

[57] ABSTRACT

An apparatus for positioning a workpiece guiding fence relative to a rotary cutter projecting through the top surface of a work table, comprising a plurality of major components, primarily formed by aluminum extrusions, including a base element securable to the work table surface and having upstanding guiding ribs, an elongated hollow carriage slidably mounted on said ribs and defining a partially cylindrical elongated recess mounting an elongated lead screw. A fence is secured to one end of the carriage. A threaded segment is mounted on a force transmitting element which is moved laterally to engage the threaded segment with the lead screw by a pivoted camming lever having three positions. In the first position, the threaded segment is disengaged from the lead screw, permitting unrestricted longitudinal movement of the carriage relative to the base. In the second position, the threaded segment is engaged with the lead screw, permitting only incremental longitudinal movement of the carriage by rotation of the lead screw. In the third position, the threaded segment remains engaged with the lead screw and the force transmitting element exerts a clamping force on one of the supporting ribs on the base plate to lock the carriage against all movement during the cutting operation.

12 Claims, 10 Drawing Sheets

FENCE POSITIONING APPARATUS

FIELD OF THE INVENTION

This invention relates generally to an apparatus for accurately and repeatably positioning a workpiece relative to a rotary cutter projecting upwardly through a horizontal work bed. More specifically this invention constitutes improvements to the workpiece positioning and guiding apparatus disclosed in my prior U.S. Pat. No. 5,215,296, the disclosure of which is incorporated herein by reference.

BACKGROUND OF THE INVENTION

In my aforementioned U.S. Pat. No. 5,215,296, there is disclosed a positioning apparatus for a fence or guide which supports a workpiece for movement relative to a rotating cutter that projects upwardly through a horizontal work bed. Such apparatus achieved an accuracy of movement on the order of one 1/1000 (0.001) of an inch, but required a plurality of machined metal components together with six rollers secured to the inner walls of a positioning carriage and a pair of nylon rods mounted on a base element for mounting such positioning carriage on the base element for movement parallel to the work bed. A fine pitched, elongated, manually rotatable lead screw was mounted in the carriage to provide micrometer movement of the carriage, but such lead screw was rotatably supported in the carriage only by two small ball bearings respectively engaging the ends of the lead screw and held in position solely by a small spring imparting an axial force to one of the balls. Since the micrometer movement of the positioning carriage results from manually moving a threaded segment into radial engagement with the lead screw, there were ample opportunities for the lead screw to be laterally shifted or elastically bent by such applied force, thus resulting in a slight error in the longitudinal positioning of the carriage.

Additionally, two separate manually operable devices were required to respectively effect engagement of the lead screw by the threaded segment and the clamping of the positioning carriage in the finally selected longitudinal position for guiding a workpiece into a desired engagement with the rotary cutter.

Those skilled in the art of machine cutting of wood workpieces often have to align the center of the workpiece with the cutting axis. For example, in the forming of wooden boxes having interlocked pins and tails at each of the corners it is recognized that symmetrical placement of such pins and tails can only be accomplished by first positioning the workpiece with its center axis accurately aligned with the axis of the rotary cutter. Prior to this invention, such alignment could only be achieved by manual measurements followed by a plurality of trial cuts.

SUMMARY OF THE INVENTION

Accordingly, it is the object of this invention to provide an improved construction of a workpiece positioning apparatus that is more accurate and reliable than prior art designs, and, at the same time, is manufacturable with a substantially reduced cost.

The two major components of a fence positioning apparatus embodying this invention constitute an elongated, generally planar base plate and an elongated, generally rectangular cross-section, hollow carriage, which is slidably mounted on the base plate for longitudinal movement.

The base plate is provided with screw holes for fixedly securing the base plate to the work bed with the length axis of the base plate generally aligned with a power driven rotary cutter which projects upwardly through the work bed. The base plate is provided on its top surface with a pair of longitudinally extending, integral, upstanding primary guide ribs, both of which define a downwardly facing surface overlying the top surface of the base plate. Additionally, a secondary integral elongated rib is provided on the top surface of the base plate outside of and parallel to the primary guide ribs. The secondary rib is provided for lateral adjustment of the carriage relative to the base plate and for mounting an upstanding spring plate, as will be described.

An adjusting or clamping bar is provided which lies parallel and adjacent to a primary rib and has an inclined surface which can cooperate with a similarly inclined surface on the carriage to clamp the carriage against longitudinal movement relative to the base plate.

The hollow carriage defines a bottom element, two laterally spaced upstanding side walls and a slightly inclined top wall connecting the sidewalls. On each longitudinal edge of the bottom wall, an integral longitudinal mounting rib is provided on said carriage which is operatively connectable with a respective one of the downwardly facing rib surfaces provided on the base plate. To effect lateral adjustment of the position of the carriage, an elongated adjusting bar of generally U-shaped cross section has one flange mounted under the downwardly facing surface of the base plate guide rib that is adjacent to the secondary rib on the base plate, and the other flange defines an angular downwardly facing surface which cooperates with the adjacent mounting rib on the carriage. Transversely disposed screws are threaded through the secondary rib to engage the adjusting bar, thus providing lateral adjustment of the carriage relative to the base plate to effect smooth longitudinal movements of the carriage relative to said base plate. The adjusting bar is also utilized to securely clamp the carriage to the base plate during the cutting operation, as will be described.

An end plate is provided on one end of the carriage adjacent to said rotary cutter, and a conventional fence, similar to that disclosed in my prior U.S. Pat. No. 5,553,644, is secured to said one end plate in perpendicular relation to the carriage. As described in said patent, a workpiece is moved along such fence in abutting relation thereto to engage the rotary cutter.

A plurality of parallel tracks are formed in the top surface of the carriage to permit printed tapes to be respectively mounted in said tracks. A transparent bar carrying a fine line cursor is mounted in transverse, overlying relationship to all of said tracks by two vertical posts secured to opposite sides of the base plate.

Lastly, a third longitudinally extending rib is integrally formed on the top portion of one side wall of the carriage. Said third rib defines an elongated semi-cylindrical recess, preferably a few degrees greater than 180 degrees in circumference, which provides a supportive rotatable mounting for an elongated finely threaded micrometer rod or lead screw.

An adjusting knob is secured to one end of the lead screw to permit convenient manual angular shifting of the lead screw. A cooperating ratchet permits slight angular movements of the adjusting knob to be readily accomplished. The amount of angular shift of the lead screw is shown by printed indicia provided on a cylinder mounted on the threaded lead screw adjacent to the adjusting knob. Similar adjusting and indicia elements are disclosed in my aforementioned U.S. Pat. No. 5,215,296.

To translate the minute angular adjustments of the lead screw into still smaller incremental longitudinal movements of the micrometer rod, a threaded segment is mounted on the free end of an upstanding leaf spring plate, which biases the threaded segment toward engagement with the lead screw. As mentioned, the spring plate has its bottom end secured to said secondary rib.

A manually operable operating lever mechanism is provided, which is mounted on the base plate. Such lever is selectably positionable in three angularly spaced pivot positions. In the first position, the threaded segment is disengaged from the threaded lead screw against the bias of the spring plate. In the second position, the threaded segment is engaged with the threaded lead screw, thus rotation of the adjusting knob will produce a desired longitudinal movement of the carriage relative to the base plate, hence relative to the rotary cutter. In the third position of the lever mechanism, a cam surface is moved transversely on a force transmitting plate to shift the adjusting bar into clamping relation with the carriage, thus anchoring the carriage against any movement relative to the base plate, which is highly desirable during the cutting operation. Thus a single lever mechanism performs the functions of two separate elements employed in my aforementioned U.S. Pat. No. 5,215,296 and effects a further reduction in manufacturing cost.

The preferred apparatus for mounting the three-position operating lever comprises a U-shaped mounting bracket firmly mounted to the base plate with screws and having a pair of upstanding lateral flanges. Each upstanding flange has two laterally spaced, transversely elongated holes respectively, an inner elongated hole and an outer elongated hole, with the inner and outer elongated holes being respectively aligned from flange to flange. The inner pair of elongated holes mounts a cylindrical pivot pin that runs through an elongated, longitudinal, semi-cylindrical recess integrally formed in the operating lever and thus defines a laterally shiftable axis of rotation of the operating lever. The outer pair of elongated holes is for mounting a pin which mounts cylindrical rollers which cooperate with two integrally formed cam surfaces on the operating lever, as described below.

The operating lever comprises a generally planar, upper grasping portion which is integrally formed with two spaced, lower curved portions. The first curved portion defines a partial cylindrical recess which is traversed by the pivot pin mounted in the inner pair of elongated holes in the vertical flange portions of the mounting bracket. The first curved portion also defines a cam surface which cooperates with the cylindrical rollers. The second curved portion defines a second cam surface which cooperates with the previously mentioned cylindrical rollers. Such cam surfaces position the operating lever in each of its aforementioned three pivotal positions, thus effecting the aforementioned movements of the threaded segment into engagement with the lead screw and moving a force plate (described below) into clamping engagement with the adjusting bar.

A means for applying the clamping force to the carriage is provided by a generally rectangular and upstanding force plate located between the adjusting bar and the secondary rib. The force plate has a longitudinal, partial cylindrical recess and a central vertical slot substantially perpendicular to and traversing the recess. The top edge of the force plate is connected to the top edge of the upstanding spring plate that also has a vertical slot. Thus the threaded segment is also secured to the force plate.

The force plate is connected to the operating lever by a transversely oriented link having two ends, with a hole in each end. The first end of the link passes through the vertical slot of the spring plate and into the vertical slot of the force plate, with the hole in the first end of the link concentrically aligned with the semi-cylindrical recess of the force plate. The link is pivotally secured to the force plate by a force plate pin running through the partial cylindrical recess of the force plate and the hole in the first end of the linkage. Similarly, the second end of the link runs through a slot in the operating lever and is pivotally mounted to such lever by the pivot pin running through the partial-cylindrical recess in the operating lever and traversing the hole in a second end of the link.

In the first lever position, the previously mentioned threaded segment, which is mounted on the force plate is disengaged from the lead screw and the force plate is disengaged from the adjusting bar under the bias of the spring plate such that the carriage may freely slide longitudinally with respect to the base plate. In the second lever position, the spring plate moves the threaded segment into engagement with the lead screw, but the force plate is still disengaged from the adjusting bar so that the longitudinal position of the carriage relative to the base plate may be finely adjusted by rotation of the lead screw. In the third lever position, the threaded segment remains engaged with the lead screw and the force plate is engaged with, and imparts a lateral clamping force on, the adjusting bar, which in turn transmits the clamping force to the adjacent one of the longitudinally extending ribs on the bottom wall of the carriage to lock the carriage to the base plate to facilitate cutting operations.

As mentioned above, it is highly desirable that a workpiece positioning apparatus be capable of locating the center of the workpiece in precise alignment with the axis of the rotary cutter to produce, for example, accurate centering spacing of pins and tails cut on the opposed edges of two workpieces to form a box corner. In accordance with this invention, the required positioning of the carriage is accomplished with the aid of a looped cord which is mounted on the exterior of the hollow carriage by being trained over two pulleys respectively journalled on pins pressed into opposite ends of the carriage. The two ends of the cord are connected to the mounting bracket of the manually operable lever mechanism. One of such connections includes a tension spring. The top flight of the looped cord lies in one of the longitudinal tracks formed in the top surface of the carriage and passes under the aforementioned transparent bar carrying a fine line cursor.

A pointer is frictionally secured to the top flight of the cord loop, which pointer is called in our trade, the "rabbit". With the aforedescribed construction, the rabbit is moved by the carriage, but the rabbit covers twice the distance traveled by the carriage. With this apparatus, the center of the rotary cutter may be precisely aligned with the center of the workpiece by manual movements of the rabbit relative to a dimensional scale inserted in another of said tracks which has printed indicia corresponding to the diameter or width range of rotary cutters that will be used. The manual method for achieving such alignment will be described in detail in the subsequent Detailed Description of the Invention.

An outstanding advantage of this invention is that five major components of the fence positioning apparatus, namely the base plate, the carriage, the adjusting bar the operating lever, and the force plate may be formed of aluminum or a rigid plastic by an extrusion process, thus eliminating all machining operations ordinarily required to produce the various ribs, slots and bolt receiving recesses heretofore described, except to cut the extrusion to the desired length, and cut slots or thread a few holes, thus effecting a substantial reduction in manufacturing cost.

Further objects and advantages of the invention will be readily apparent to those skilled in the art from the following detailed description, taken in conjunction with the annexed sheets of drawings showing a preferred embodiment of the invention.

DETAILED DESCRIPTION OF THE PREFERRED EMBODIMENTS

Figure 1:
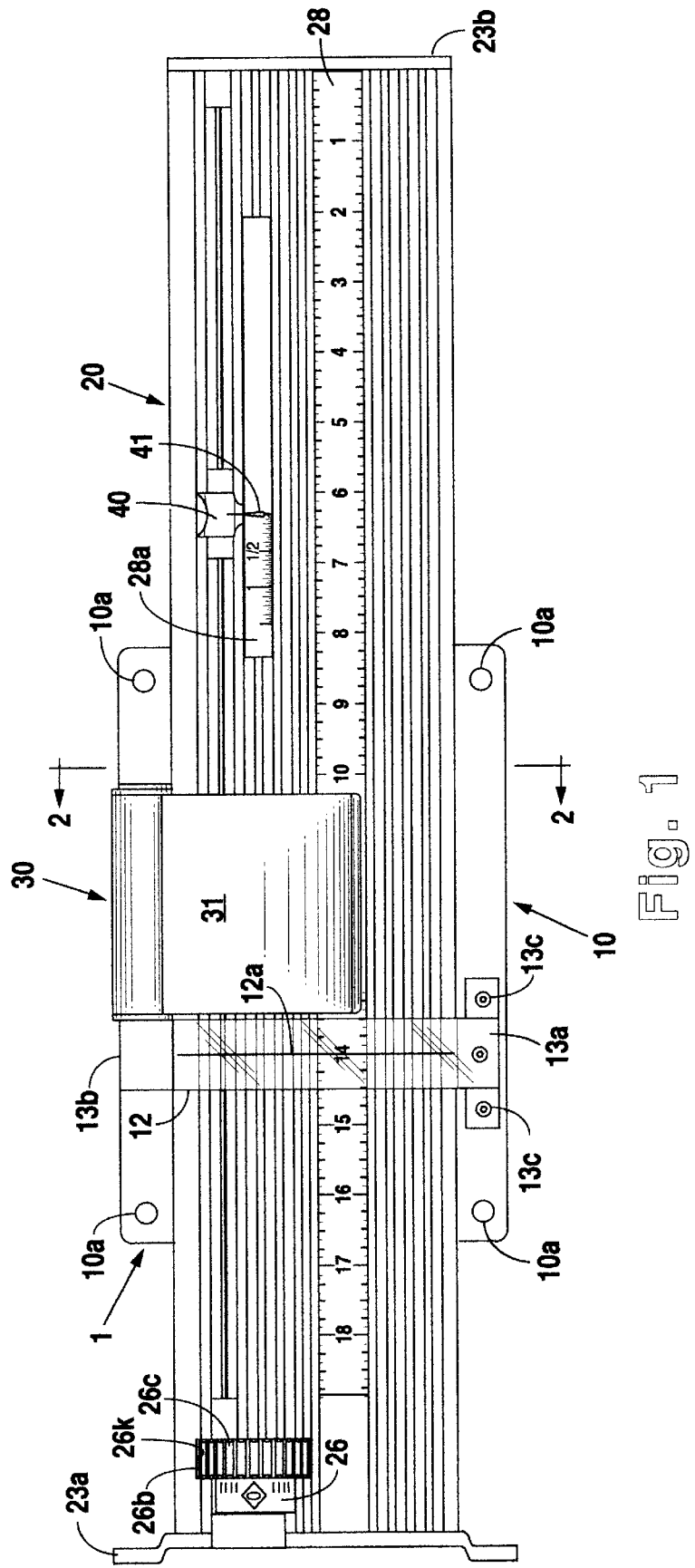
FIG. 1 is a top elevational view of a positioning apparatus embodying this invention.
Figure 1A:
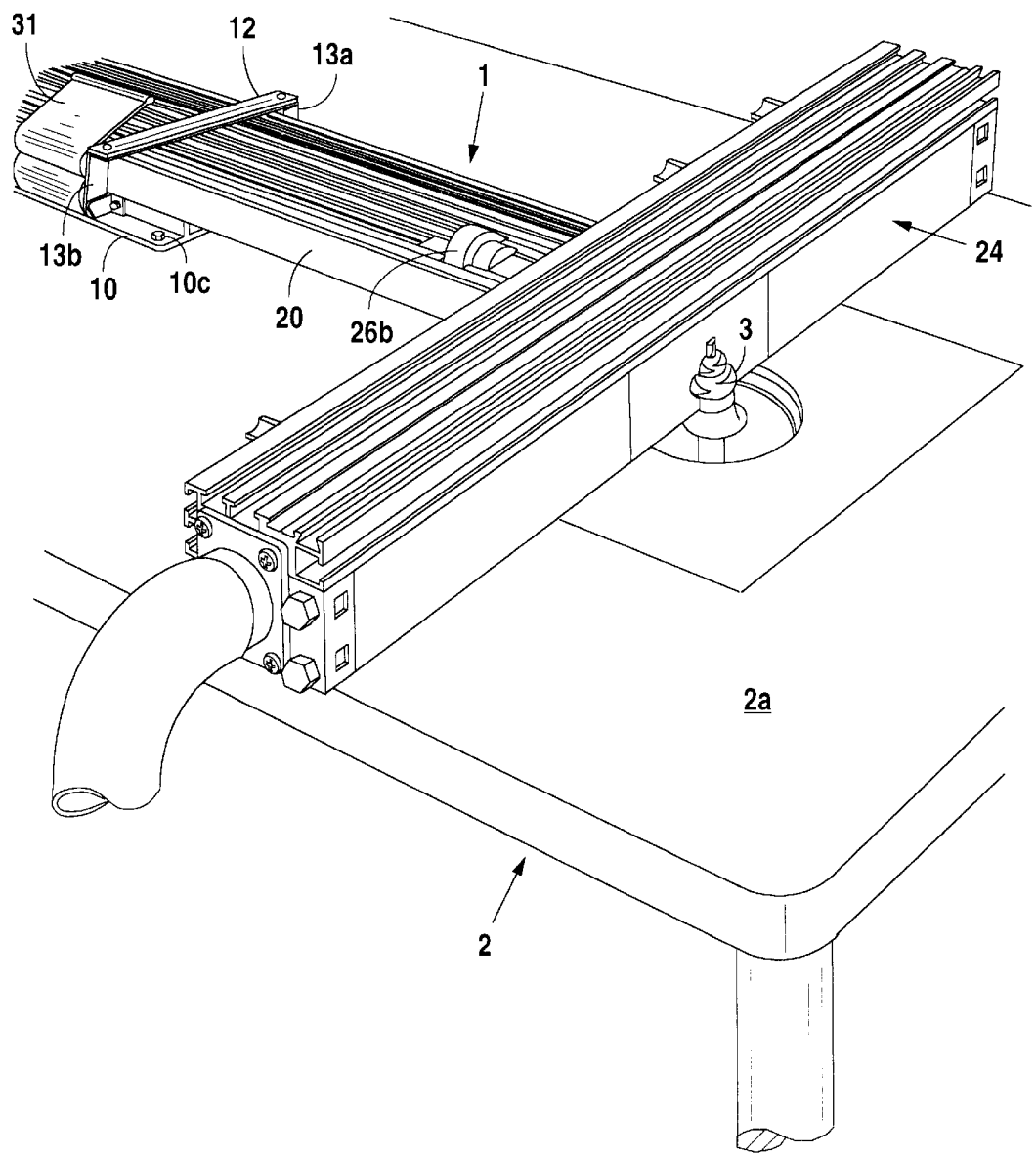
FIG. 1A is a reduced scale, perspective view illustrating the cooperation of the positioning apparatus of this invention with the fence and a rotary cutter.

Referring to the drawings there is shown a fence positioning apparatus 1 embodying this invention. Apparatus 1 comprises a horizontal base plate 10 of rectangular configuration and having vertical holes 10a for reception of screws or bolts 10c (FIG. 1A) for securing the base plate 10 to the top surface 2a of a work table 2. A rotary cutting tool 3 driven by a suitable motor (not shown) projects upwardly through top surface 2a of table 2 and the base plate 10 is secured to the work table 2 with its longitudinal axis aligned with and intersecting the rotary axis of cutting tool 2.

Figure 2A:
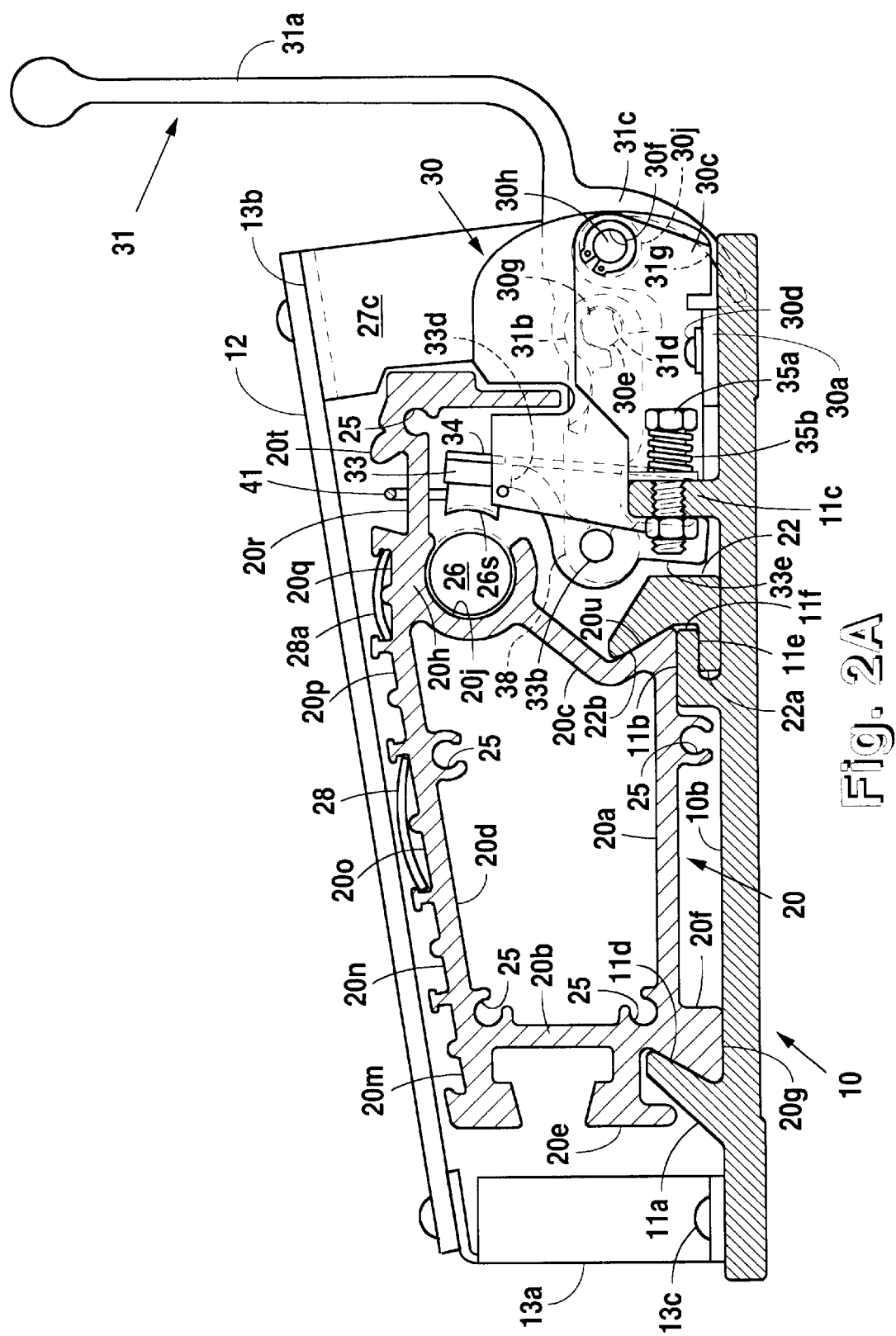
FIG. 2A is a cross-sectional view taken on the plane 2—2 of FIG. 1 illustrating the first position of the operating lever permitting unrestrained longitudinal movement of the carriage with respect to the base plate.

A fence carrying carriage 20 is provided comprising an elongated hollow element formed by extrusion of a suitable metal or rigid plastic. Carriage 20 has a generally rectangular cross-sectional configuration defined by a bottom wall 20a, two upstanding side walls 20b and 20c and a slightly inclined top wall 20d connecting the top portions of side walls 20a and 20b (FIG. 2A). All of said walls are integrally formed by a conventional extrusion process.

As best shown in FIG. 2A, the top surface 10b of base plate 10 is formed with three integral upstanding parallel ribs 11a, 11b and 11c which are parallel to the length axis of base plate 10. Rib 11a projects upwardly from the top surface 10b of base plate 10 at an angle, thus defining a downwardly facing inclined surface 11d. The adjacent rib 11b is of angular cross-section and thus defines a downwardly facing surface 11e. The third rib 11c is close to rib 11b and is vertical.

The left hand edge of side wall 20b of carriage 20 has an integral side projection 20e which surrounds the upper portion of base plate rib 11a. The left hand edge of bottom wall 20a has an integral projection 20f that slidably cooperates with downwardly facing inclined surface 11d of rib 11a. The bottom surface 20g of projection 20f slides on the top surface 10b of base plate 10. The right hand edge of carriage bottom wall 20a is horizontal and slides on the top surface of base plate rib 11b.

Figure 7:
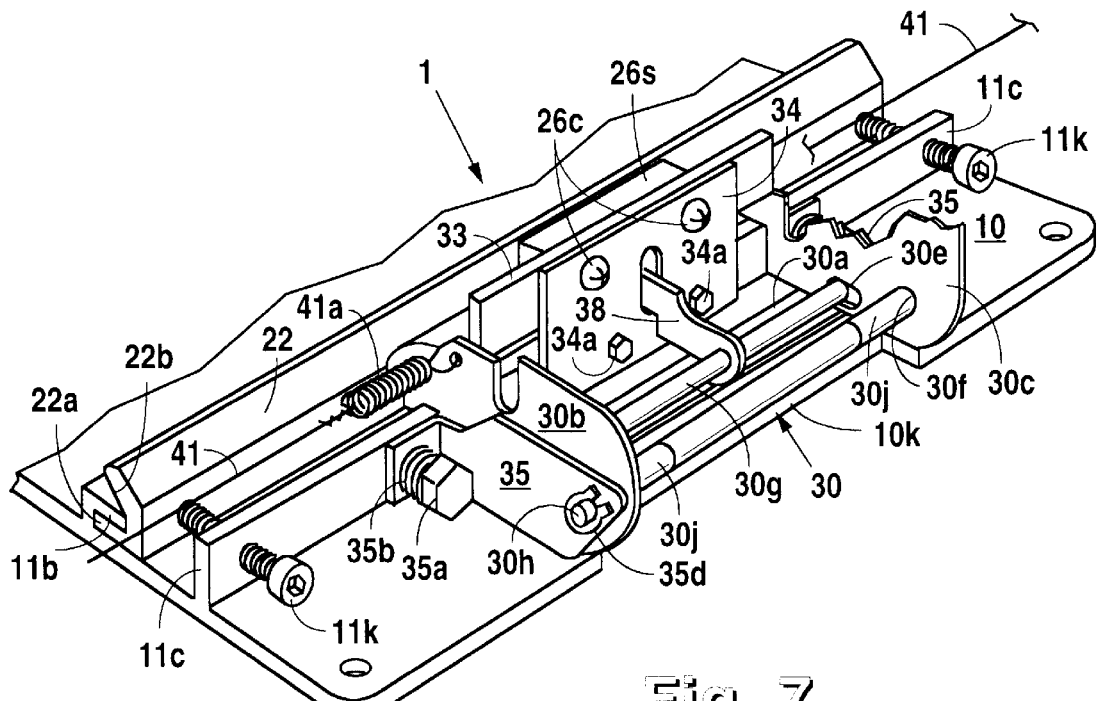
FIG. 7 is a partial perspective view of the operating mechanism with the carriage, the operating lever and the sighting bar removed for clarity.

To secure carriage 20 to base plate 10 for smooth longitudinal sliding movements, an elongated adjusting and clamping bar 22 is provided having a horizontal projection 22a which fits beneath the downwardly facing surface 11e of the base plate rib 11b, and a downwardly facing inclined side surface 22b that overlies a similarly inclined surface portion 20u formed on the right hand side wall 20c of carriage 20. A pair of longitudinally spaced bolts ilk, shown in FIG. 7, traverse rib 11c of plate 10 and contact clamping bar 22 to adjust its lateral position relative to rib 11b. Thus, carriage 20 is secured to base plate 10, but is freely longitudinally slidable relative to the base plate 10, hence can be smoothly moved toward or away from the axis of cutting tool 3.

A first end plate 23a (FIG. 1) is secured by bolts (not shown) in transverse relationship to the end of carriage 20 that is adjacent the cutting tool 3. A conventional workpiece supporting fence 24 (FIG. 1A), similar to that shown in the above referred to U.S. Pat. No. 5,553,644, is then secured to end plate 23a, hence is disposed in perpendicular relationship to the length axis of carriage 20. Such fence is then movable to a selected position relative to the cutting tool 3 by movement of carriage 20 relative to base plate 10.

A second end plate 23b is secured by bolts (not shown), to the other end of carriage 20 for a purpose to be described. To facilitate the provision of bolt holes for mounting the end plates 23a and 23b, the carriage 20 is formed with integral projections defining partial cylindrical recesses 25 (FIG. 2A) extending the length of carriage 20 which are only threaded at their ends.

The carriage 20 is further provided with an integral lateral projection 20h adjacent the junction of the right hand side wall 20c and top wall 20d which defines an elongated partial cylindrical recess 20j for supporting a finely threaded lead screw 26. The partial circular recess 20j has a peripheral extent of more than 180°, so that the lead screw 26 can only be inserted in such recess by axial movement and is secured in the recess between the two end plates 23a and 23b, as will be described.

Figure 3:
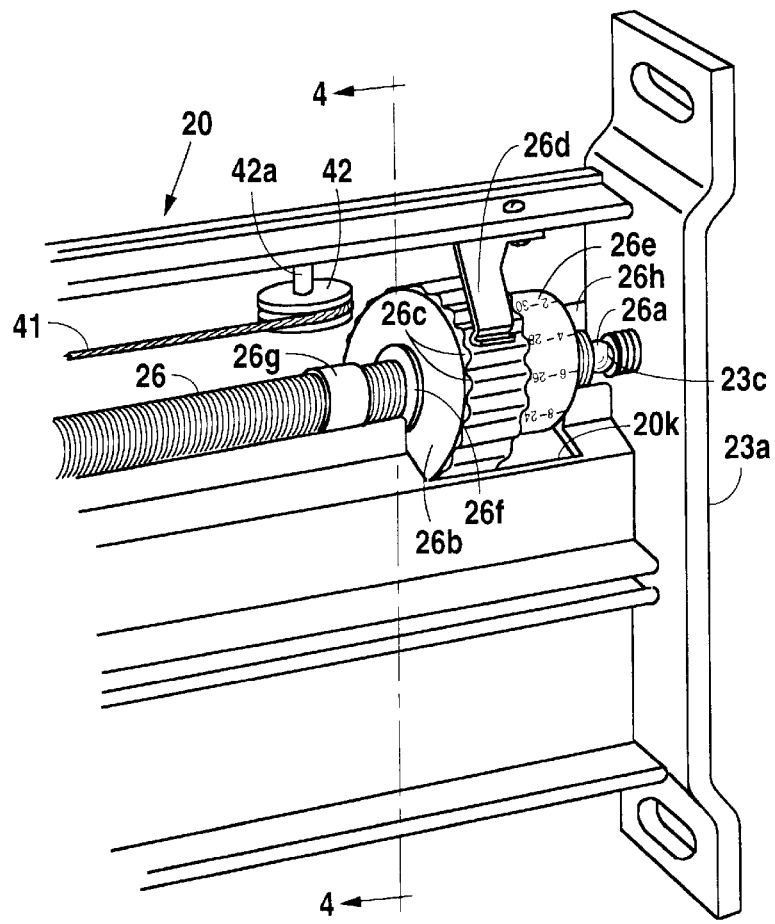
FIG. 3 is an enlarged scale, partial perspective bottom view illustrating the operating knob for rotating the lead screw.
Figure 4:
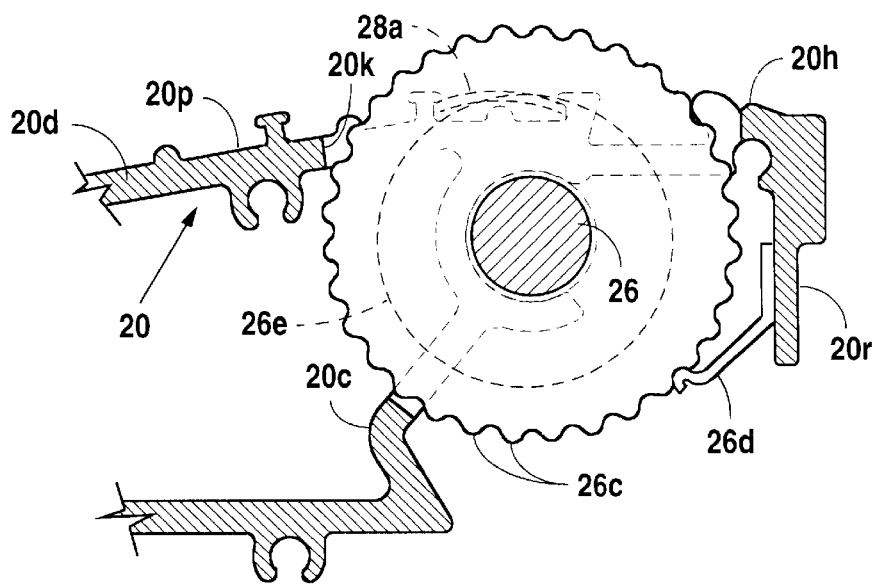
FIG. 4 is a sectional view taken on the plane 4—4 of FIG. 3.

A bearing ball 26a (FIG. 3) is provided at the end of lead screw 26. A threaded ball socket 23c permits adjustment of the axial force on the lead screw 26 to support the lead screw 26 between the respective end plate 23a and 23b. A metal clip 26g is inserted in each end of partial cylindrical recess 20j to impart a light bias of lead screw 26 against the inner wall of recess 20j.

Manual rotation of lead screw 26 is conveniently accomplished by an enlarged knob 26b secured to one end of lead screw 26. Knob 26b has peripherally spaced ratchet teeth 26c formed thereon and a spring detent 26d (FIG. 3) cooperates therewith to permit small incremental rotational movements of lead screw 26 which result in even smaller longitudinal movements (as low as 0.001 inches) of the carriage 20 toward and away from the rotary cutting tool. A portion of knob 26b projects through a cut out 20k transversely cut through top wall 20d and projection 20h. If desired, a conventional thrust washer 26f may be inserted between knob 26b and the wall of the cutout 20k in carriage 20.

Figure 2B:
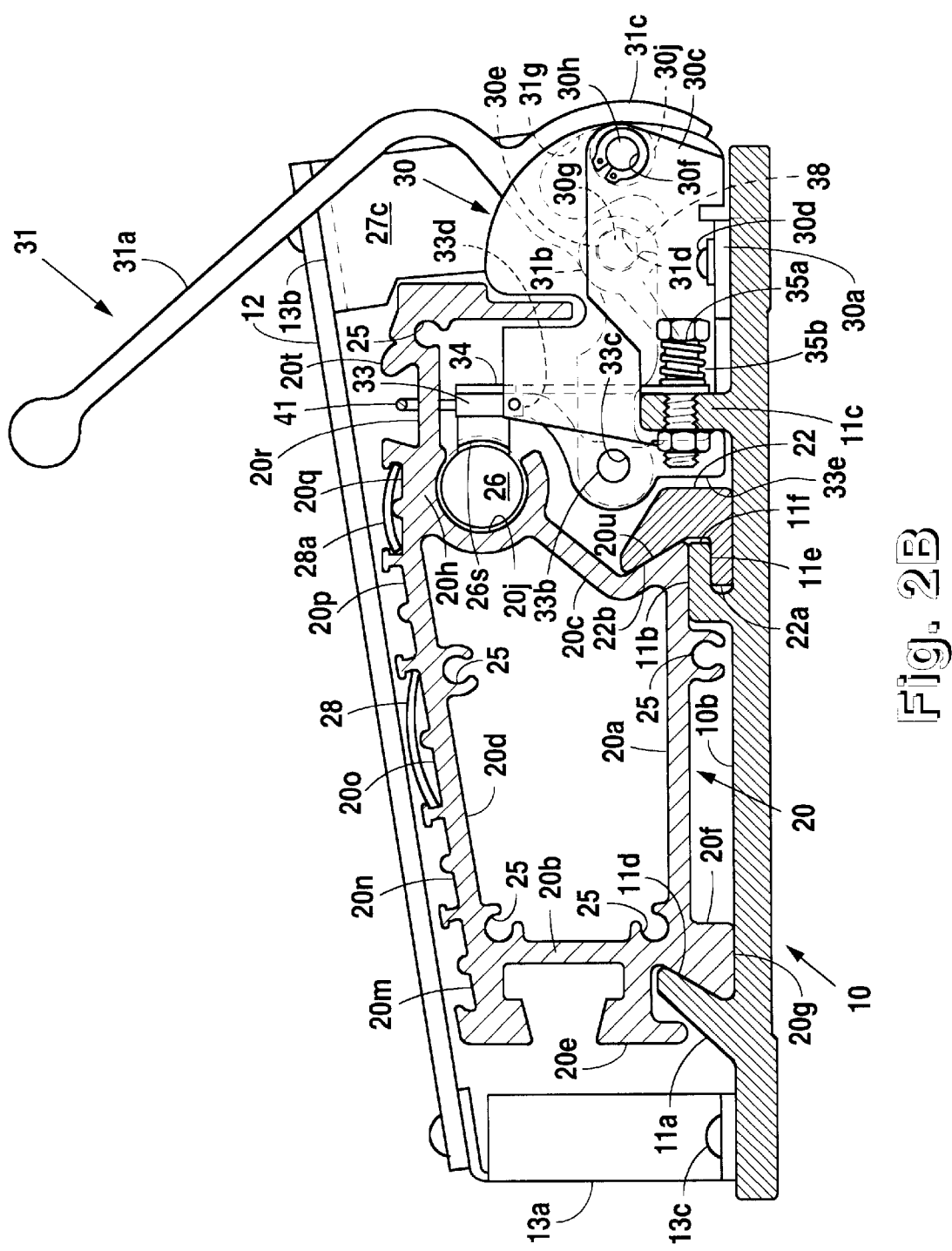
FIG. 2B is a sectional view similar to FIG. 2A but illustrating the second position of the operating lever wherein the carriage is micrometrical adjustable relative to the base plate by rotation of a lead screw.
Figure 2C:
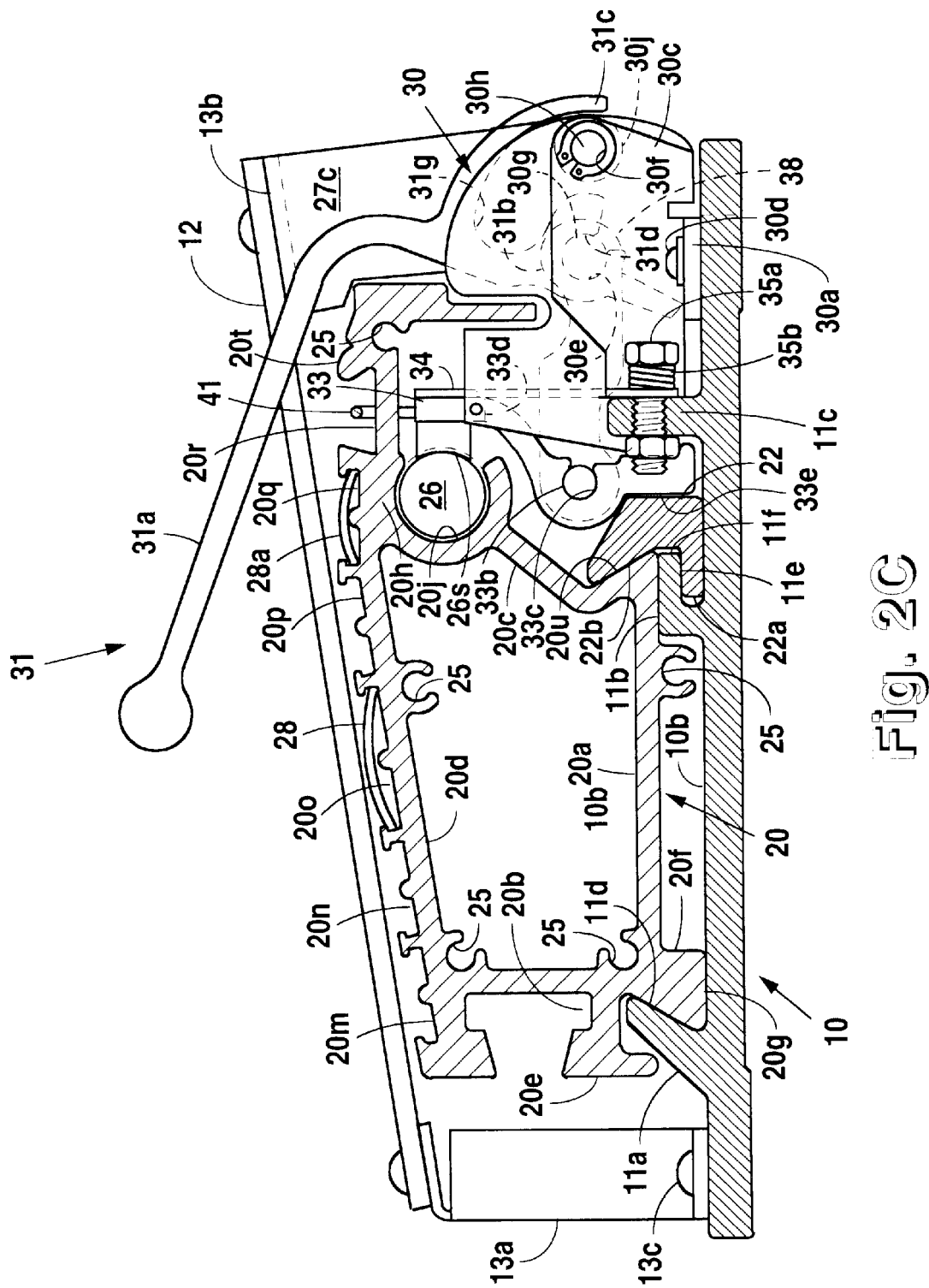
FIG. 2C is a sectional view similar to FIG. 2A but illustrating the third position of the operating lever wherein the carriage is locked relative to the base plate for effecting the cutting operation.

Manual rotation of lead screw 26 is converted into small increments of axial movement of the carriage 20 relative to the base plate 10, hence, toward and away from the rotary cutting tool 3, by a threaded segment 26s (FIG. 2A) which is adjustably mounted on the base plate 10 by an actuating mechanism 30 to be described, which effects the radial movement of threaded segment 26s from a position of non-engagement with the lead screw 26 (FIG. 2A) to a position of engagement with the threads of the lead screw 26 (FIGS. 2B and 2C).

The carriage 20 is further provided with a plurality of parallel, longitudinally extending T-slots 20m, 20n, 20o, 20p, and 20q in its top surface 20d. Such slots are employed for mounting elongated plastic strips 28 (FIG. 1) carrying printing of dimensions or cutting positions of the carriage 20 relative to the rotary cutting tool 3, as will be described. A dovetailed slot 20r is formed in a lateral projection 20t formed as an extension of carriage top wall 20d. This slot slidably mounts an indicator 40 as will be described.

To effect a measured longitudinal displacement of the carriage 20, an annular scale 26e is wrapped around the end of lead screw 26. The dimensions of scale 26e may be either degrees of rotation or thousandths of an inch displacements of carriage 20.

An accurate selection of movement of carriage 20 relative to the base plate 10 may also be obtained by the cooperation of a sighting line 12a on a transverse transparent sighting bar 12 with dimensions or carriage position indicia provided on the elongated strips 28. Sighting bar 12 is mounted at its opposite ends on upstanding pedestals 13a and 13b. Pedestal 13a is secured to one side of base plate 10 by suitable bolts 13c. Pedestal 13b can be an extension of bracket flange 27c, as will be described. Preferably, sighting line 12a comprises two vertically aligned lines respectively provided on the top and bottom surfaces of sighting bar 12.

As previously mentioned, the threaded segment 26s is engaged with the lead screw 26 when the operating lever 31 of the actuating mechanism 30 is in the two lowered positions shown in FIGS. 2B and 2C. The threaded segment 26s is disengaged from the lead screw 26 when the control lever 31 is in its uppermost position. The carriage 20 is then freed for longitudinal sliding movement relative to the base plate 10.

The preferred apparatus 30 for mounting the three position control lever 31 comprises a generally U-shaped mounting bracket (FIG. 7) having a base portion 30a and upstanding, longitudinally spaced vertical flange portions 30b and 30c. If desired, flange portion 30c may be extended upwardly to form the pedestal 27c. Base portion 30a is secured to base plate 10 by suitable screws 30d. Each upstanding flange 30b and 30c is provided with two laterally spaced holes, respectively, an inner hole 30e and an outer hole 30f, with said holes being respectively longitudinally aligned and transversely elongated.

Figures 5, 6A:
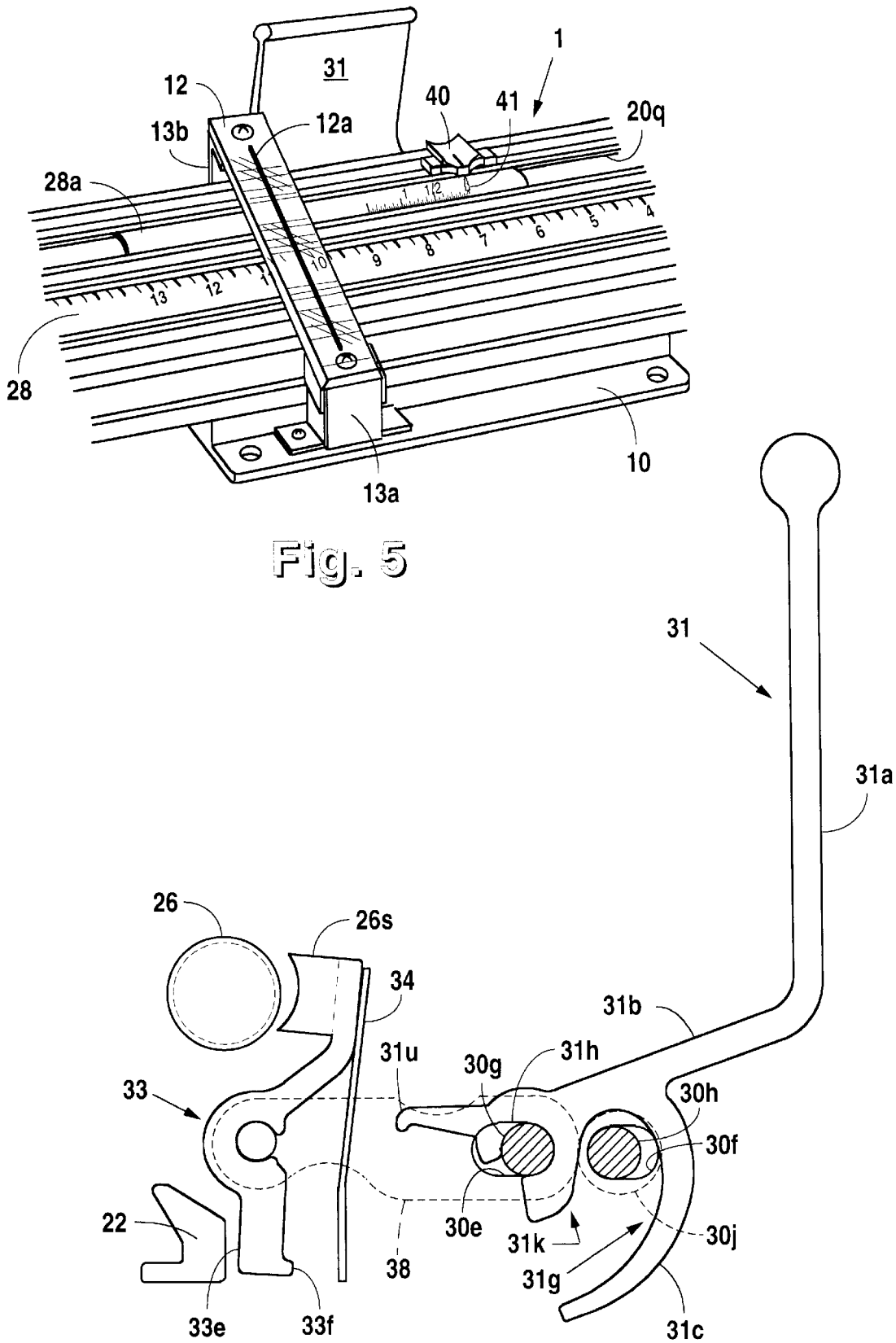
FIG. 5 is a perspective view of a portion of the apparatus of FIG. 1, showing the centering scale and its cooperating pointer or rabbit.
FIG. 6A is a schematic side elevational view of the three position control lever showing the position of the camming surfaces relative to the cam rollers in the first position of the operating lever.

The operating lever 31 has a planar, upper grasping portion 31a and two integrally formed, vertically spaced curved lower portions 31b and 31c (FIG. 6A). The upper curved portion 31b, which is approximately perpendicular to portion 31a, defines a partial cylindrical, longitudinal recess 31d which snugly surrounds a pivot pin 30g which is mounted in elongated inner holes 30e of bracket 30a. The outer holes 30f mount a pin 30h (FIG. 7) which rotatably mounts two rollers 30j which are engaged by a first cam surface 31g formed on the outer curved lower portion 31c of operating lever 31, or by a second cam surface 31k formed on the inner curved portion 31b. In the upper or disengaged position of the operating lever 31 as shown in FIG. 2A, the arcuate surface 31v (FIG. 9), at the merger of first and second cam surface 31g and 31k, is in the contact with rollers 30j thus limiting the upward movement of the operating lever 31.

Figure 9:
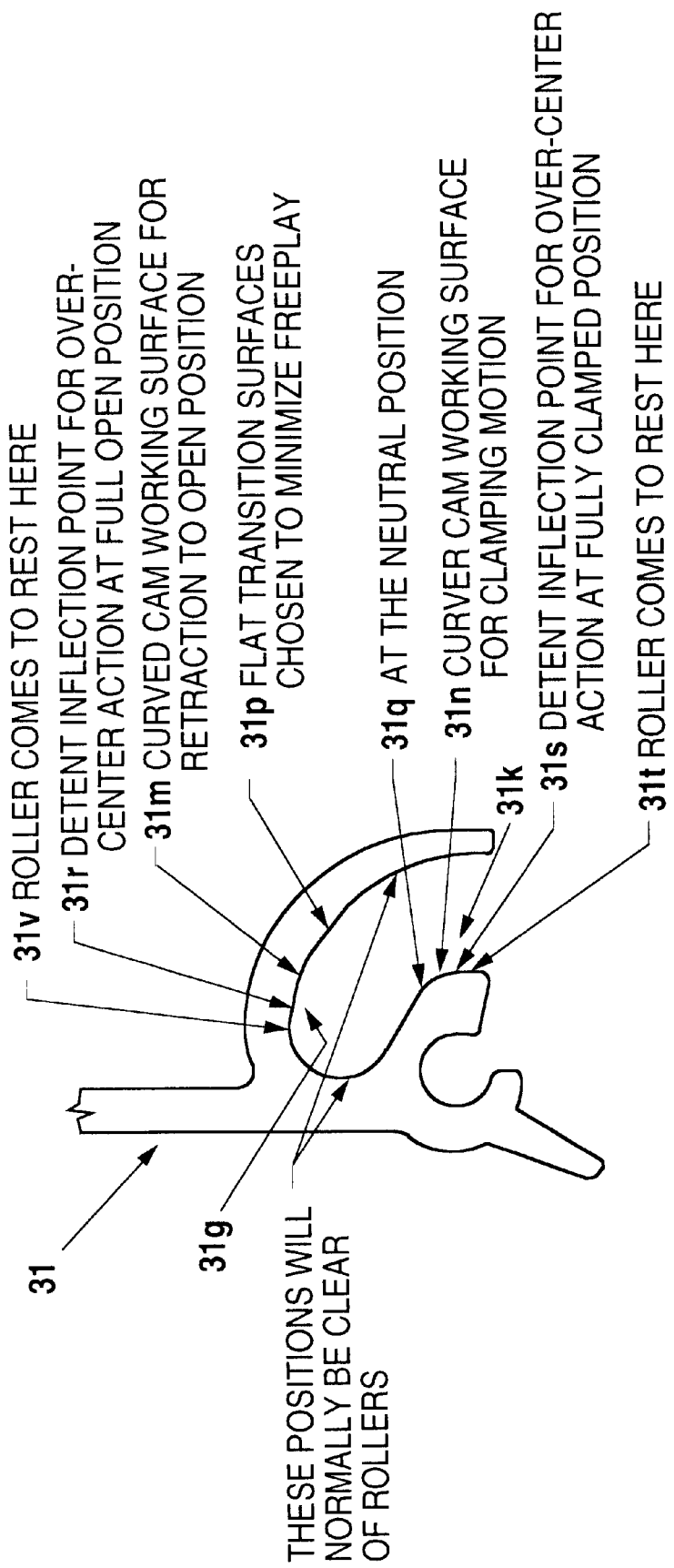
FIG. 9 is an enlarged scale vertical sectional view of the camming portions of the operating lever with a text description of the various portions of the two camming surfaces.

As best shown in FIG. 9 the two cam surfaces are formed as several connected, variously radiused curved, and flat surfaces. The cusp 31r, at the juncture of surfaces 31v and 31m, provides the slope reversal required to detent the lever 31 in the upper position. Likewise, the cusp 31s at the juncture of surfaces 31n and 31t provides detent action in the lowered position shown in FIG. 2C. Intermediate flat surfaces 31p and 31q cooperate to minimize free play in the middle position shown in FIG. 2B.

Figure 8:
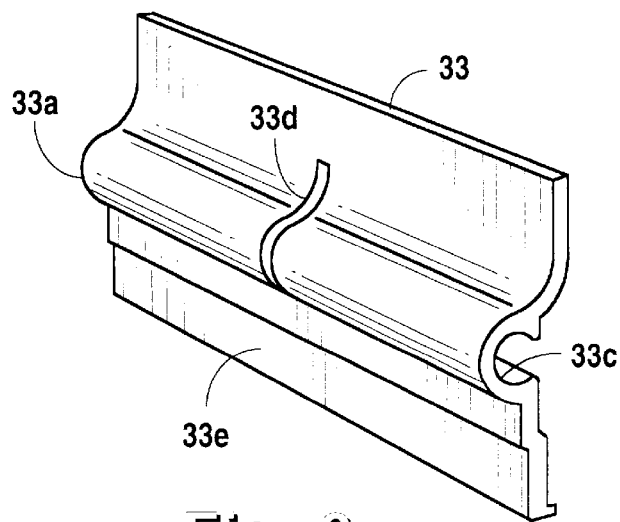
FIG. 8 is a perspective view of the force plate.

The threaded segment 26s is rigidly secured by suitable bolts 26c to the upper portion of a force plate 33 which has a curved medial portion 33a (FIG. 8) and a vertical portion 33e positioned adjacent the latching bar 22. An actuating link 38 has one end pivotally secured to the center of a pivot pin 30g by passing through a slot 31h (FIG. 6A) in the upper curved portion 31b of the operating lever 31. The other end of link 38 is pivotally secured to the center of a pin 33b which longitudinally traverses a partial cylindrical recess 33c provided in the lower portion 33a of the force plate 33 (FIG. 8). A slot 33d in the center of the lower portion 33a of the force plate 33 permits such connection to be made.

For a purpose to be later described, a transversely inward spring bias on both ends of pin 30h is desirable. Such spring bias is applied by a pair of angularly shaped brackets 35 having two flanges. Each bracket 35 has one flange secured to a respective end of pin 30h by a spring clip 35d and the second flanges are respectively secured in abutting relation to rib 11c by bolts 35a which respectively traverse the second bracket flanges and are threadably engaged with rib 11c. The spring bias is applied by two compression springs 35b which respectively surround bolts 35a and are compressed between the bolt heads and the adjacent surface of the second flanges of brackets 35.

Figure 6B:
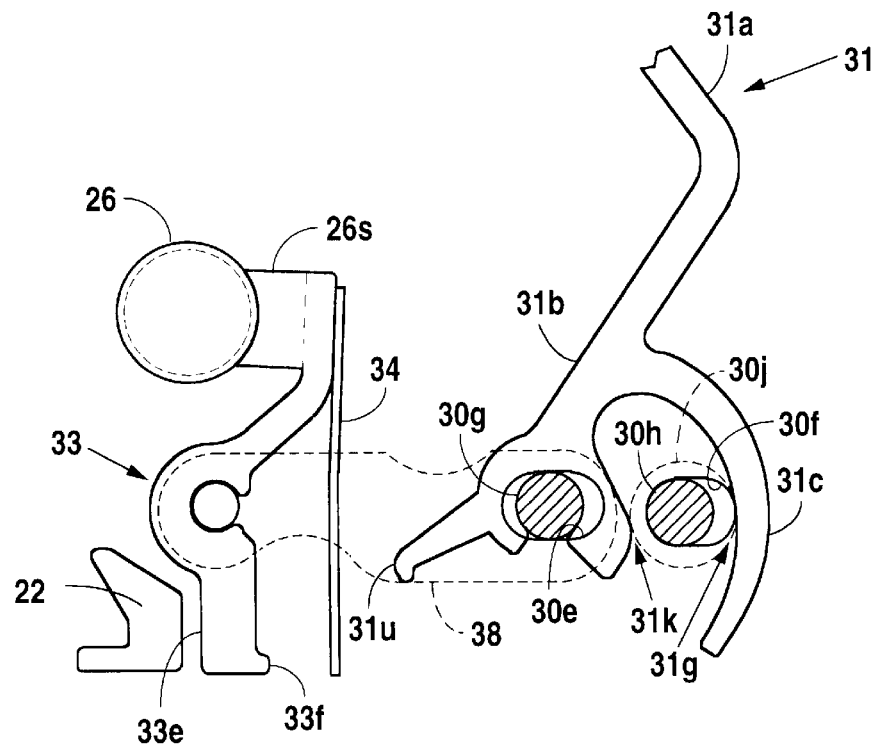
FIG. 6B is a view similar to FIG. 6A, but showing the operating lever in its second position to engage the threaded segment with the lead screw.
Figure 6C:
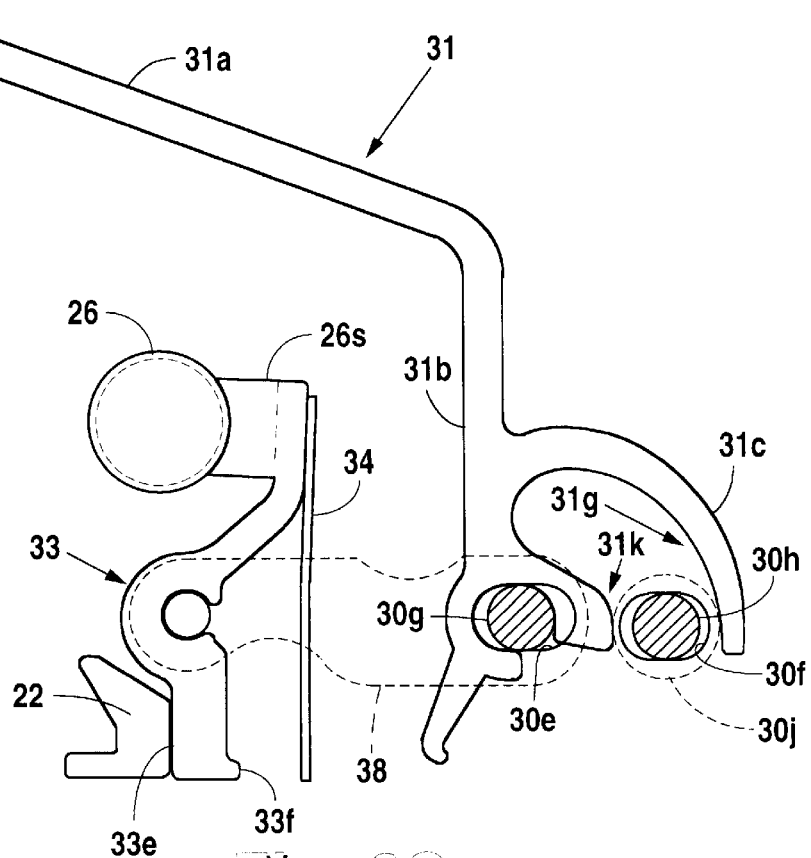
FIG. 6C is a view similar to FIG. 6A, but showing the operating lever in its third or clamping position to maintain the threaded segment in engagement with the lead screw and move the adjusting bar into clamping engagement with the carriage.

The force plate 33 is supported by a generally vertical spring plate 34 which has its lower edge portions secured to rib 11c by a pair of bolts 34a (FIG. 7) traversing plate 34. Spring plate 34 thus opposes outward transverse movement of force plate 33 and, if not acted upon by other elements, biases threaded segment 26s into intimate engagement with the lead screw 26 as shown in FIG. 6B. In this middle position, the pin 30h is held against the inner end of elongated holes 30f by the right angle brackets 35 acted upon by springs 35b (FIG. 7), and the pin 30g is in a static location dictated by the stationary force plate 33 and the link 38. The handle 31 therefore seeks a relaxed position where the rollers 30j float in the transitional regions 31p and 31q between the first and second cam surfaces (FIGS. 6B and 9). In this state, carriage 20 is movable only by rotation of the knob 26b on lead screw 26.

Whenever the handle 31 is moved to the upright position (FIG. 6A) from the neutral position (FIG. 6B), the decreasing radius portion of the first cam surface 31g works with the rollers 30j, rotating on pin 30h, to pull the threaded segment 26s away from the lead screw 26. Since the pin 30h is initially forced against the inner end of elongated holes 30f by the right angle brackets 35 acted upon by springs 35b, the entire handle is translated away from the lead screw as it is rotated to the upright position. Once the roller has passed the cusp 31r (FIG. 9), the prevailing restoring force of the resilient plate causes the roller to seek contact with, and stop against, surface 31v. During the above motion, a small protruding ridge 33f along the lower edge of the force plate 33, in contact with the rib 11c, provides a fulcrum for the force plate, as a 3rd class lever, to multiply the translational movement, of the handle, and consequently the link, resulting in generous clearance between the threaded segment and the lead screw.

Downward pivotal motion of control lever 31 from the middle or neutral position (FIG. 2B) to the position illustrated in FIG. 2C, serves to clamp and lock the carriage against any movement relative to the base plate 10, which is highly beneficial during the cutting operation. As the motion begins, a curved cam surface 31n (FIG. 9) with increasing radius relative to the axis of pin 30g, works with rollers 30j to cause link 38 to move force plate 33 inward toward the adjusting bar 22. When all clearance has been removed between relevant surfaces of the carriage 20, base plate 10, adjusting bar 22, and the lower end of force plate 33, further translation of pivot pin 30g is halted. Because the rollers have traversed only about one half the rise in cam surface 31n at this point, further motion forces the pin 30h to move outward within the elongated slots 30f thereby carrying the angle brackets 35 along and compressing springs 35b against retaining nuts 35a. When the cusp 31s passes the rollers 30j, a torque is developed on the handle that assists its downward motion until arrested by contact between a handle extension 31u and the horizontal base 30a of the U-shaped mounting bracket. As can be seen in FIG. 2C, the total clamping force applied to the force plate 33, by means of link 38 and pin 33b, is divided between the threaded segment 26s engagement of the lead screw and the adjusting bar 22 with the greater portion, by ratio of the distances, applied to the adjusting bar 22.

The aforementioned spring moderated over-travel provides predictable clamp-up forces in spite of the common production variability in thickness, parallelism, and twist inherent in the extrusion process and resulting components.

The operation of the fence positioning device described is conventional except for one unique feature of Applicants' invention. Referring to FIG. 5, there is shown a plastic centering tape 28a mounted in the T slot 20q. Adjacent to T slot 20q is a dovetailed longitudinal slot 20r. An indicator 40, called by us a rabbit, is slidably mounted in slot 20r. Rabbit 40 is in turn secured to a cord 41 which has its opposite ends secured by one or two springs 41a to opposite ends of the mounting bracket 30a. Cord 41 forms a tight loop extending the full length of carriage 20 by being trained around two pulleys 42 respectively mounted on inwardly projecting pins 42a mounted on the side wall 20d of carriage 20 FIG. 3). Thus sliding movement of rabbit 40 produces movement of carriage 20 in the same direction, but only for one half of the movement of the rabbit 40.

The plastic tape 28a carries indicia corresponding to the range of diameters of cutters 3 to be employed. A very difficult wood cutting operation is the symmetrical cutting of interlocking pins and tails on two wood pieces to form a corner. To achieve this, the fence must be accurately located relative to the axis of the rotating cutter 3 so that the exact center line of the workpiece passes through the cutter axis.

With the apparatus of this invention, such requirement is readily accomplished. The longitudinal position of carriage 20 is adjusted so that the workpiece supporting surface of the fence 24 is just touching the cutter diameter. The special centering tape 28a is then moved in its supporting slot so that the cutter diameter indicia line on the tape 28a is aligned with the sighting line 12a of cursor 12. The fence 24 is withdrawn from the cutter by sliding movement of the carriage 20. The workpiece is then inserted between the fence 24 and the cutter 3 where it makes light contact with both. Without further movement of the carriage 20, the rabbit pointer 40 is then moved, by sliding along its cable, into alignment with the zero on the centering tape, which is marked by a carrot symbol. The workpiece is then withdrawn and the carriage 20 is moved toward the cutter until the rabbit pointer indicia is directly under the cursor line 12a. This last action moves the carriage, hence the fence, toward the cutter a distance of one half the workpiece width due to the two-to-one ratio of rabbit movement to carriage movement. Thus, the centerline of the workpiece, when placed against the fence, is exactly aligned with the axis of the rotary cutter without requiring a single measurement.

If the alignment of the rabbit with the cursor is not exact, the fence can be moved, in 0.001 inch increments, by shifting the operating lever 31 to its middle position and then rotating the knob 26b on the lead screw 26. The fence is then locked in that position by pivoting the operating or control lever 31 downwardly to assume the carriage locking position shown in FIG. 2C.

A conventional cutting tape may then be inserted in one of the T-slots on the top surface 20d of carriage 20 and utilized to successively position the carriage 20 to accurately cut the desired pins and tails on the workpiece.

Obvious modifications of this invention will occur to those skilled in the art and all such modifications are deemed to fall within the scope of the annexed claims.

We claim:

1. Apparatus for aligning a workpiece guide fence relative to a rotary cutting element projecting upwardly through a horizontal bed plate, comprising, in combination:

an elongated base plate of generally planar configuration having a pair of laterally spaced, upstanding primary longitudinal ribs on the top surface thereof;

means for rigidly securing said base plate to said horizontal bedplate with said primary ribs directed toward said rotary cutter;

each of said primary ribs defining a downwardly facing surface;

an elongated hollow carriage, said carriage having a generally rectangular cross sectional configuration defined by a generally horizontal bottom surface, two laterally spaced, upstanding side walls, and a top wall secured to said side walls;

a pair of longitudinally extending ribs respectively formed on the longitudinal edges of said bottom wall and respectively operatively connected to said downwardly facing surfaces of said primary ribs of said base plate to slidably secure said carriage to said base plate for longitudinal movement toward and away from said rotary cutter;

a transverse end plate formed on the end of said carriage adjacent said rotary cutter for abuttingly supporting a workpiece guiding fence;

one of said upstanding side walls having a lateral projection defining an elongated semi-cylindrical recess;

an elongated lead screw rotatably mounted in said recess;

manually operable thread engaging means shiftably mounted on said base plate and movable into threaded engagement with said lead screw, whereby rotation of said lead screw provides vernier adjustment of the position of said carriage toward and away from said cutter; and means for manually rotating said lead screw.

2. The apparatus of claim 1 further comprising a spring clip insertable adjacent each end of said partial cylindrical recess and engaging said lead screw to bias said lead screw into engagement with the inner wall of said recess.

3. The apparatus of claim 1 further comprising a longitudinally extending first track formed in said top wall;

a centering scale frictionally slidably mounted in said first track and having dimensions printed thereon corresponding to the diameter range of available rotary cutters;

a transparent bar fixedly mounted on said base plate in transverse overlying relationship to said first track and providing a hair line cursor cooperating with said centering scale, whereby when said carriage is shifted toward said rotary cutter to position said workpiece in touching relation to said rotary cutter, said centering scale may be positioned with the cutter thickness dimension on said centering scale aligned with said cursor;

a rabbit pointer; and means for shifting said rabbit pointer longitudinally relative to said carriage by longitudinal movement of said carriage to produce movement of the rabbit pointer twice that of said carriage, whereby insertion of a workpiece between said fence and said rotary cutter and movement of said rabbit by said carriage to zero position on said centering scale, followed by movement of said rabbit by said carriage to align said rabbit with said cursor, will position the center of the workpiece in exact alignment with the center of the rotary cutter.

4. The apparatus of claim 3 further comprising a second longitudinally extending integral track formed in said top surface of said carriage; and a second printed scale frictionally mounted in said second track and having spaced printed indicia thereon cooperable with said hairline cursor to indicate the successive positions of the carriage relative to said rotary cutter to produce desired cuts on a workpiece.

5. The apparatus of claim 3 wherein said means for shifting comprises a cord friction ally engagable with said rabbit pointer;

a pair of cord pulleys mounted on said carriage in longitudinally spaced relation;

the ends of said cord being operatively secured to said base plate; and the intermediate portions of said cord being trained around said pulleys, whereby any longitudinal movement of said carriage relative to said base plate will produce a longitudinal displacement of said rabbit pointer that is twice said longitudinal movement of said carriage.

6. The apparatus of claim 1 further comprising an elongated lateral adjustment bar slidably mounted on said base plate beneath one of said downwardly facing primary rib surfaces and defining a downwardly facing surface to cooperate with one of said longitudinally extending ribs on said carriage;

a secondary longitudinally extending integral rib formed on said base plate in parallel relationship to said adjusting bar; and means operative between said secondary base plate rib and said adjusting bar for adjusting the lateral position of said adjusting bar to control the degree of frictional engagement of said carriage relative to said base plate.

7. The apparatus of claim 1 wherein said manually operable thread engagement means comprises;

a manually shiftable lever pivotally mounted on said base plate;

a threaded segment operatively connected to said lever and movable by said lever from a first position of disengagement with said lead screw to a second position of engagement with said lead screw.

8. The apparatus of claim 7 wherein said manually operable lever is shiftable to a third position wherein said threaded segment remains engaged by said lever with said lead screw, and said lever imparts a lateral clamping force on the adjacent one of said longitudinally extending ribs on said bottom wall of said carriage to lock said carriage to said base plate for the cutting operation.

9. Apparatus for aligning a workpiece guide fence relative to a rotary cutting element projecting upwardly through a horizontal bed plate, comprising, in combination:

an elongated base plate of generally planar configuration formed by extrusion and having a pair of laterally spaced integral, upstanding primary longitudinal ribs;

means for rigidly securing said base plate to said horizontal bedplate with said primary ribs directed toward said rotary cutter;

each said primary ribs defining a downwardly facing surface;

an elongated hollow carriage formed by extrusion, said carriage having a generally rectangular cross-sectional configuration defined by a generally horizontal bottom surface, two laterally spaced, upstanding side walls, and a top wall supported by said side walls;

a pair of longitudinally extending ribs respectively integrally formed on the longitudinal edges of said bottom wall and respectively operatively connected to said downwardly facing surfaces of said primary ribs of said base plate to slidably secure said carriage to said base plate for longitudinal movement toward and away from said rotary cutter;

said carriage having a plurality of partial circular recesses extending the length thereof;

the end portions of said recesses being internally threaded;

a pair of end plates respectively transversely secured to the ends of said carriage by bolts engaging said intern ally threaded recesses;

one of said end plates being constructed to support a workpiece guiding fence;

one of said upstanding side walls having an integral lateral projection defining an elongated semi-cylindrical recess;

an elongated lead screw rotatably mounted in said recess;

manually operable thread engaging means shiftably mounted on said base plate and movable into threaded engagement with said lead screw, whereby rotation of said lead screw provides vernier adjustment of the position of said carriage toward and away from said cutter; and means for manually rotating said lead screw.

10. An apparatus for positioning and clamping a carriage that has an elongated longitudinal lead screw and that is longitudinally and slidably mounted to a base plate, comprising:

a manually shiftable lever pivotally mountable on said base plate;

a force plate operatively connected to said lever;

a threaded segment operatively connected to said force plate; and means for positioning said lever in:

a first position wherein said threaded segment is disengaged from said lead screw and said force plate is disengaged from said carriage;

a second position wherein said threaded segment is engaged with said lead screw and said force plate is disengaged from said carriage; and a third position wherein said threaded segment is engaged with said lead screw and said force plate is concurrently engaged with said carriage such that said force plate imparts a lateral clamping force on said carriage to lock said carriage to said base plate.

11. The apparatus defined in claim 10 further comprising a resilient plate having a bottom portion securable to said base plate to position said resilient plate in upstanding relation thereto;

said resilient plate having an unsecured top end portion; and said threaded segment being secured to said top end portion of said resilient plate and biased by said resilient plate toward threaded engagement with said lead screw.

12. The apparatus of claim 10 wherein said force plate is also secured to said top end portion of said resilient plate.

* * * * *